No. 778,557. Patented December 27, 1904.

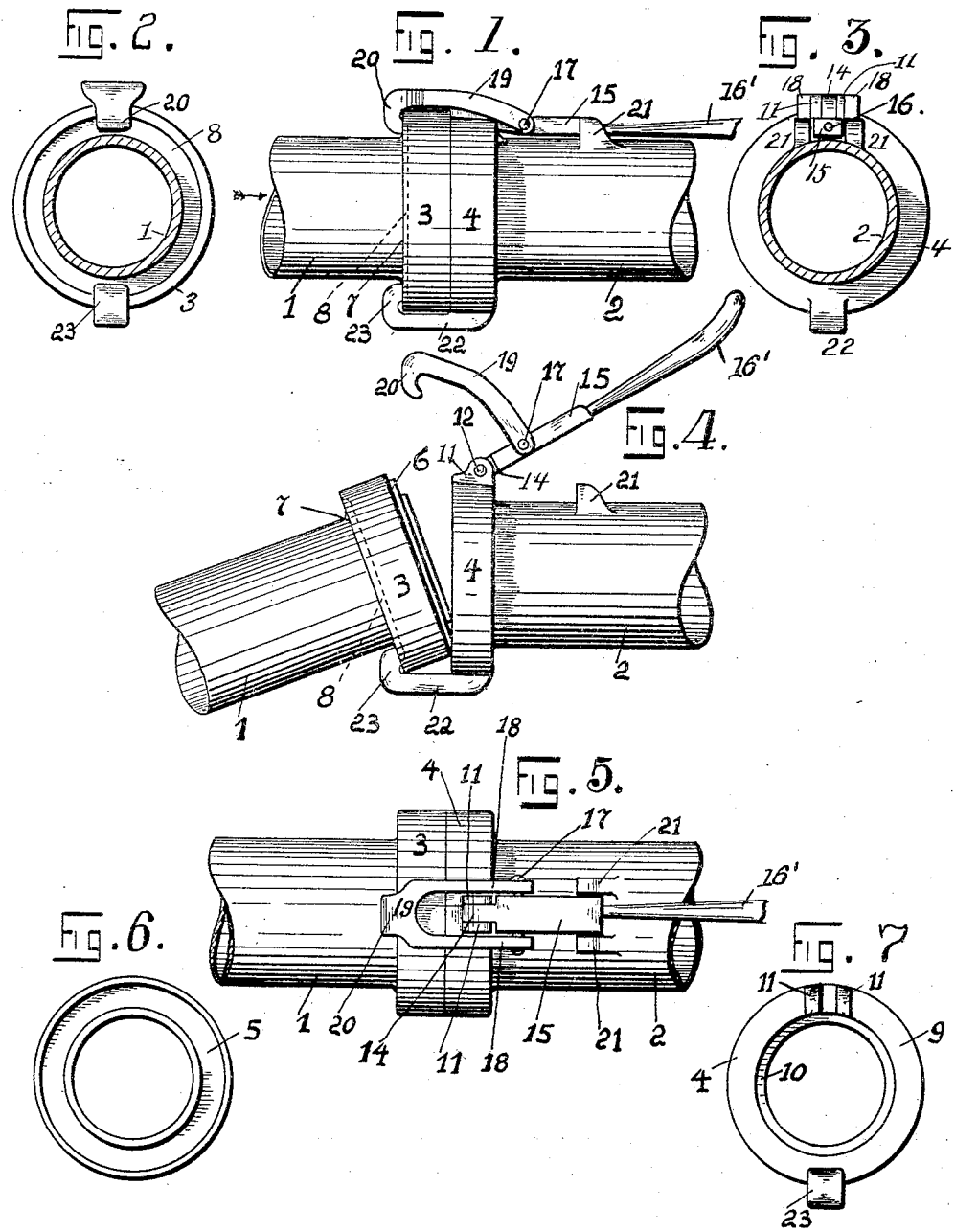

UNITED STATES PATENT OFFICE.

JOSEPH SZÉPE, OF ALLEGHENY, PENNSYLVANIA.

HOSE-COUPLING.

SPECIFICATION forming part of Letters Patent No. 778,557, dated December 27, 1904.

Application filed June 8, 1904. Serial No. 211,664.

*To all whom it may concern:*

Be it known that I, JOSEPH SZÉPE, a subject of the Emperor of Austria-Hungary, residing at Allegheny, in the county of Allegheny and State of Pennsylvania, have invented certain new and useful Improvements in Hose-Couplings, of which the following is a specification, reference being had therein to the accompanying drawings.

This invention has relation to hose-couplings; and the object of this invention is the provision of novel means whereby two sections of pipe may be easily, quickly, and effectually secured together.

A further object of my invention is to provide a hose-coupling which will be extremely simple in construction, strong and durable, and highly efficient to the many usages to which it is applied, and while my improved hose-coupling is particularly adapted for sections of hose I have constructed the same whereby two sections of pipe may be as easily and effectually secured together as two sections of hose.

The above construction will be hereinafter more fully described, and specifically pointed out in the claims, and referring to the drawings accompanying this application like numerals of reference indicate like parts throughout the several views, in which—

Figure 1 is a side elevation of my improved hose-coupling. Fig. 2 is an end view looking in the direction of the arrow of Fig. 1. Fig. 3 is an end view looking in the opposite direction from that of Fig. 2. Fig. 4 is a side elevation of my improved hose-coupling, showing one of the hose-sections being detached. Fig. 5 is a top plan view of my improved hose-coupling. Fig. 6 is an end view of the uncoupled end of one of the sections, and Fig. 7 is an end view of the uncoupled end of the other section.

Referring to the accompanying drawings, the reference-numerals 1 and 2 indicate two sections of pipe to which two sections of hose may be secured in any desired manner, and each one of these sections of pipe is provided with an enlarged collar 3 and 4, and the face of the enlarged collar 3 is provided with an annular recess 5, in which a rubber gasket 6 is mounted. The shoulder 7 of the collar 3 is provided with an annular groove 8, the object of which will be hereinafter described. The face 9 of the collar 4 is provided with an annular recess 10, and formed integral with this collar are lugs 11 11, between which is journaled by a pin 12 the contracted end 14 of a lever 15, this lever being provided with a recess 16 in its end whereby a suitable bar or rod 16' may be placed therein to facilitate the manipulation of said lever. To this lever are pivoted by a pin 17 the arms 18 18 of a hook-shaped lever 19, the hook portion 20 of which is adapted to engage in the annular groove 8 of the collar 3 when the sections are coupled together.

The pipe-section 2 has formed integral with it the lugs 21 21, which are adapted to receive the end of the lever 15 when the pipe-sections are joined together, and the reference-numeral 22 designates a projection which is formed integral with the collar 4, said projection extending outwardly from said collar and has its outer end bent upwardly, forming a hook 23, which also is adapted to engage the annular groove 8 of the collar 3.

The manner of securing the two sections of pipe together is as follows: The pipe-section 1, which carries the gasket 6, is placed in the position shown in Fig. 4, the annular groove 8 of the collar 3 engaging the hooked end 23 of the projection 22, at which time the hook-shaped end 20 of the lever 19 is engaged in the annular groove 8, and upon depressing the lever 15 the pipe-section 1 is drawn into engagement with the pipe-section 2, the rubber gasket 6 entering the annular recess 10 and forming a water-tight connection between said pipe-sections, and when the pipe-section 1 has been drawn into position the lever 15 is adapted to lie between the lugs 21 21, whereby the end of said lever will be protected and prevented from striking any objects whereby the same could be moved to such a position as to uncouple the pipe-sections. By pivoting the lever 15 to the collar 4 the fulcrum-point of the lever 19 when in a locked position will lie below the center-line or pivot-point of the lever 15, and said lever will be normally held in this locked position until raised to such a height as the fulcrum of the lever 19 is above the center-line of the pivot 12, at which time the pipe-section 1 can be readily removed.

It will be noted that various changes may be made in the details of construction without departing from the general spirit of the invention.

What I claim, and desire to secure by Letters Patent, is—

1. A hose-coupling composed of two sections of pipe having abutting ends, each having an integral collar, one of said collars having an annular groove on its outer face, the other of said collars carrying a fixed hook, and a pivoted lever, carrying a pivoted hook, the pivoted hook and fixed hook both engaging said annular groove in the opposite member, said lever being pivoted to the collar and the said pivoted hook being attached to the lever between the end of the lever and the pivotal point of the same.

2. In a pipe-coupling the combination of two abutting members one being formed with a collar having a groove extending around its outer face, the other member carrying on one side a rigid hook adapted to engage said groove and on the other side a lever pivoted adjacent the end of said member, lugs on said last-named section between which the lever is adapted to lie when in its depressed position, a bar or rod extending rearwardly from the free end of said lever and a hook-shaped lever hinged to the first-named lever between its pivotal point and said rod or bar, and adapted to engage said groove, the members being so constructed and arranged as to be revoluble one on the other when joined together.

In testimony whereof I affix my signature in the presence of two witnesses.

JOSEPH SZÉPE.

Witnesses:
WM. C. HEITZ,
K. H. BUTLER.